US012809636B2

(12) United States Patent
Goshima et al.

(10) Patent No.: US 12,809,636 B2
(45) Date of Patent: Nov. 24, 2026

(54) BACKEND PIPELINE OPERATION PROCESSING APPARATUS SEPARATED BY BUFFERS INTO SECTIONS THAT CAN INDIVIDUALLY STOP PROCESSING

(71) Applicants: FUJITSU LIMITED, Kawasaki (JP); Inter-University Research Institute Corporation Research Organization of Information and Systems, Tachikawa (JP)

(72) Inventors: Masahiro Goshima, Itabashi (JP); Yi Ge, Bunkyo (JP)

(73) Assignees: Fujitsu Limited, Kawasaki (JP); Inter-University Research Institute Corporation Research Organization of Information and Systems, Tokyo (JP)

( * ) Notice: Subject to any disclaimer, the term of this patent is extended or adjusted under 35 U.S.C. 154(b) by 0 days.

(21) Appl. No.: 17/666,829

(22) Filed: Feb. 8, 2022

(65) Prior Publication Data

US 2022/0300289 A1 Sep. 22, 2022

(30) Foreign Application Priority Data

Mar. 17, 2021 (JP) ................................. 2021-044100

(51) Int. Cl.
*G06F 9/38* (2018.01)

(52) U.S. Cl.
CPC .......... *G06F 9/3869* (2013.01); *G06F 9/3826* (2013.01); *G06F 9/3887* (2013.01)

(58) Field of Classification Search
CPC ..... G06F 9/3869; G06F 9/3867; G06F 9/3826
See application file for complete search history.

(56) References Cited

U.S. PATENT DOCUMENTS

| | | | | |
|---|---|---|---|---|
| 5,325,495 A * | 6/1994 | McLellan | G06F 9/3804 | 712/229 |
| 5,918,034 A * | 6/1999 | Petolino, Jr. | G06F 9/3836 | 712/216 |
| 6,065,105 A * | 5/2000 | Zaidi | G06F 9/3836 | 712/23 |

(Continued)

OTHER PUBLICATIONS

Shioya et al., "Register Cache System not for Latency Reduction Purpose", Proceedings of the 43rd Annual IEEE/ACM International Symposium on Microarchitecture (MICRO43), Dec. 2010, pp. 301-312, cited in Specification (12 pages).

(Continued)

*Primary Examiner* — Keith E Vicary
(74) *Attorney, Agent, or Firm* — WHDA, LLP

(57) ABSTRACT

An operation processing apparatus includes one or more lanes, each of which processes at most one element operation of an instruction per cycle, and an element operation issuing unit that issues the element operation to the one or more lanes. An entirety of the operation processing apparatus is separated into a plurality of sections by buffers including a plurality of entries. Zero or more of the sections that are unable to continue processing of element operations stop the processing, and remaining sections each continue the processing of element operations by storing element operations proceeding to the downstream section into the immediately downstream buffer.

1 Claim, 12 Drawing Sheets

(56) References Cited

U.S. PATENT DOCUMENTS

| | | | | |
|---|---|---|---|---|
| 6,112,295 | A * | 8/2000 | Bhamidipati | G06F 9/3867 711/167 |
| 6,629,167 | B1 * | 9/2003 | Undy | G06F 9/3867 712/E9.046 |
| 7,058,793 | B1 * | 6/2006 | Hartnett | G06F 9/3867 712/219 |
| 9,600,288 | B1 * | 3/2017 | Potter | G06F 9/383 |
| 2007/0136562 | A1 * | 6/2007 | Caprioli | G06F 9/3836 712/E9.046 |
| 2011/0179256 | A1 * | 7/2011 | Klaiber | G06F 9/384 712/218 |
| 2015/0058572 | A1 * | 2/2015 | Olson | G06F 9/3824 711/125 |

OTHER PUBLICATIONS

Yamada et al., "Skewed Multistaged Multibanked Register File for Area and Energy Efficiency", IEICE Transactions on Information and Systems, Apr. 2017, vol. E100-D, No. 4, pp. 822-837, cited in Specification (16 pages).

Yamada et al., "Bank-Aware Instruction Scheduler for a Multibanked Register File", IPSJ Journal of Information Processing, Sep. 2018, vol. 26, pp. 696-705, cited in Specification (10 pages).

* cited by examiner

BACKEND PIPELINE OPERATION PROCESSING APPARATUS SEPARATED BY BUFFERS INTO SECTIONS THAT CAN INDIVIDUALLY STOP PROCESSING

CROSS-REFERENCE TO RELATED APPLICATION

This application is based upon and claims the benefit of priority of the prior Japanese Patent application No. 2021-044100, filed on Mar. 17, 2021, the entire contents of which are incorporated herein by reference.

FIELD

The embodiment discussed herein is related to an operation processing apparatus.

BACKGROUND

In the field of high-performance computing using supercomputers and the like, High-Performance CG(HPCG) is attracting attention as a benchmark for measuring performance closer to real applications. HPCG is a benchmark for the Conjugate Gradient (CG) method.

The computation of HPCG is the solution of a simultaneous linear equation by the multigrid preconditioned conjugate gradient method (MGCG), and the scalar product between the row of a sparse matrix A and a dense vector x occupies 80 percent of the computing. Since HPCG is based on 27-point stencils, the number of non-zero elements in one row of the sparse matrix A is as small as 27. Therefore, the sparse matrix A is usually stored in the form of Compressed Sparse Row (CSR) and the like.

The load from the dense vector x in this scalar product will pick up the elements corresponding to the 26-27 non-zero elements in the row of the sparse matrix A, which results in accessing non-contiguous blocks each of which is composed of three or less contiguous elements. Such an indirect and non-contiguous load/store operation via a list of addresses is called gather/scatter.

[Non-Patent Reference 1] Ryota Shioya, Kazuo Horio, Masahiro Goshima, Shuichi Sakai, "Register Cache System Not for Latency Reduction Purpose", Proceedings of the 43rd Annual IEEE/ACM International Symposium on Microarchitecture (MICRO43), Pages 301-312, December, 2010

[Non-Patent Reference 2] Junji Yamada, Ushio Jimbo, Ryota Shioya, Masahiro Goshima, Shuichi Sakai, "Skewed Multistaged Multibanked Register File for Area and Energy Efficiency", IEICE Transactions on Information and Systems, Vol. E100.D, Issue 4, Pages 822-837, April, 2017

[Non-Patent Reference 3] Junji Yamada, Ushio Jimbo, Ryota Shioya, Masahiro Goshima, Shuichi Sakai, "Bank-Aware Instruction Scheduler for a Multibanked Register File", IPSJ Journal of Information Processing, Vol. 26, Pages 696-705, September, 2018

However, since a conventional processor core has poor efficiency in the gathering/scattering process, the processing speed may be lowered due to the occurrence of such a gathering/scattering process.

SUMMARY

According to an aspect of the embodiments, an operation processing apparatus including one or more lanes each of which processes at most one element operation of an instruction per cycle, and an element operation issuing unit that issues the element operation to the one or more lanes, wherein an entirety of the operation processing apparatus is separated into a plurality of sections by buffers including a plurality of entries, zero or more of the sections that are unable to continue processing of element operations stop the processing, and remaining sections each continue the processing of element operations by storing element operations proceeding to the downstream section into the immediately downstream buffer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

[A] Related Example

The high peak-performance of some recent high-performance processor cores is implemented by Single Instruction/Multiple Data stream (SIMD) units. In a SIMD unit, v elements are packed into a single register and v operations are executed simultaneously in obedience to a single instruction. This can make the peak performance to be v times without modifying the controlling unit. For example, when a 512b SIMD is used as a 64b (double-precision floating-point)×8, the operation throughput come to be 8 times.

In SIMD loading/storing, consecutive v elements can be accessed at once when the target elements are contiguous in the memory. Such contiguous loading/storing performance has v times higher throughput, and the same SIMD effects as the other operations can be exhibited.

On the other hand, when the target elements of SIMD loading/storing are non-contiguous in the memory, the advantageous effect of the SIMD unit is not obtained. Indirect and non-contiguous loading/storing through a list of addresses are referred to as gathering/scattering. In gathering/scattering, even if accessing consecutive v elements, it is rare that all the v elements are used, which means that the performance of the gathering/scattering is much lower than v times.

Figure 1:
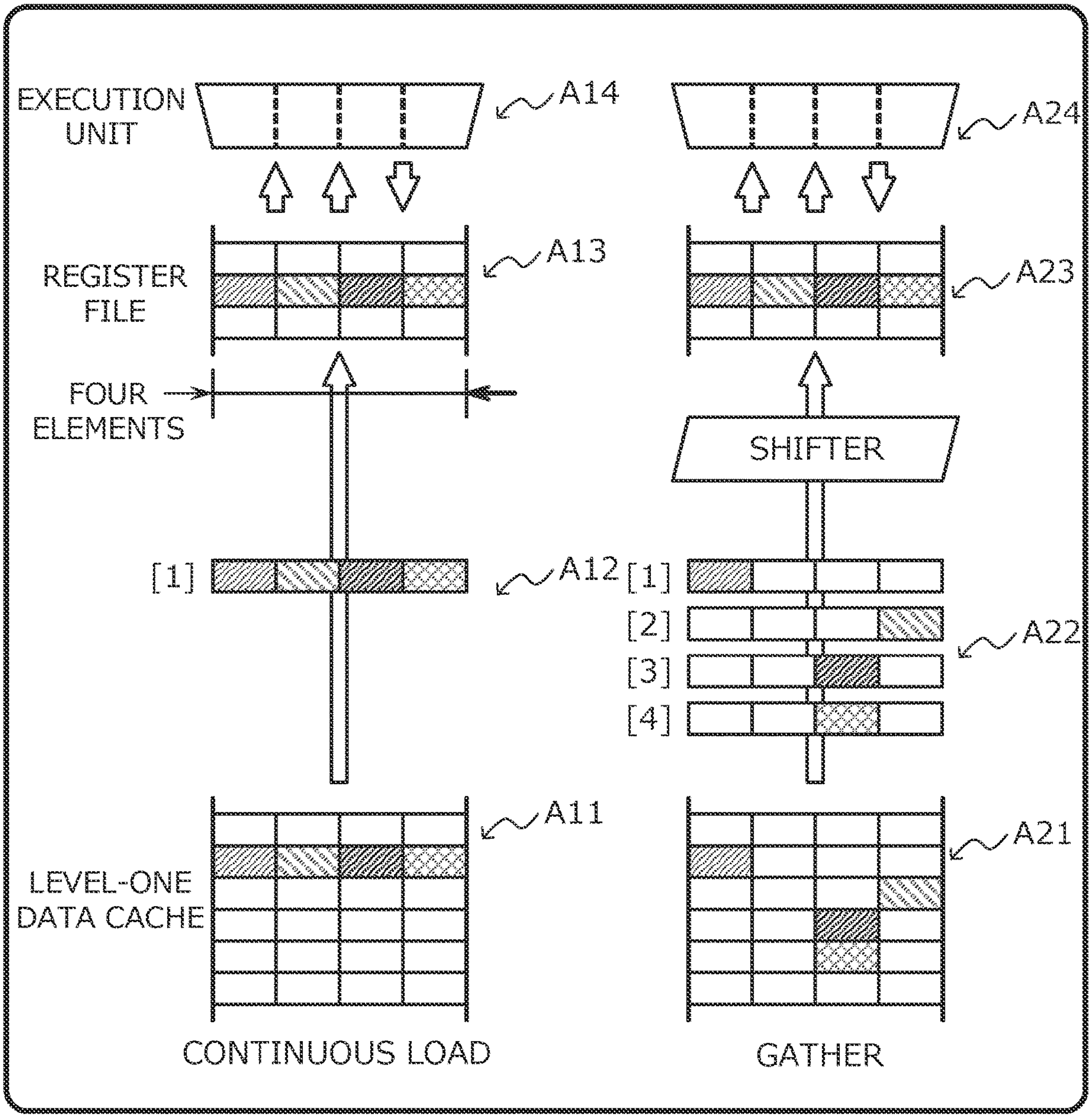
FIG. 1 is a diagram illustrating contiguous loading and gathering of a SIMD unit.

FIG. 1 is a diagram illustrating contiguous loading and gathering of a SIMD.

In a contiguous loading process indicated by the reference symbols A11 to A14, four elements stored in contiguous addresses on the level-one data cache are read, as indicated by the reference symbol A11. Consequently, as indicated by the reference symbol A12, a block including the four elements is read by a single access unit [1]. Then, as indicated by the reference symbol A13, the four elements are written into a register file having a SIMD width of four elements, and the four elements written in the register file are used by an execution unit as indicated by the reference symbol A14.

In a gathering process indicated by the reference symbols A21 to A24, elements stored in non-contiguous addresses on the level-one data cache are read, as indicated by the reference symbol A21. In this case, the four elements are unable to be read all at once, and therefore four blocks including the four elements need to be read by the access units [1] to [4] as indicated by the reference symbol A22. Then, the four elements are written into a register file through a shifter as indicated by the reference symbol A23, and the four elements written in the register file are used by the execution unit as indicated by the reference symbol A24.

A multi-port memory, which is capable of accessing v elements of arbitrary addresses, increases in area and energy in proportion to v2. Therefore, in order to increase the gathering/scattering throughput by v times like the calculation throughput, it is assumed that multibanking is used as pseudo-multiporting.

Figure 2:
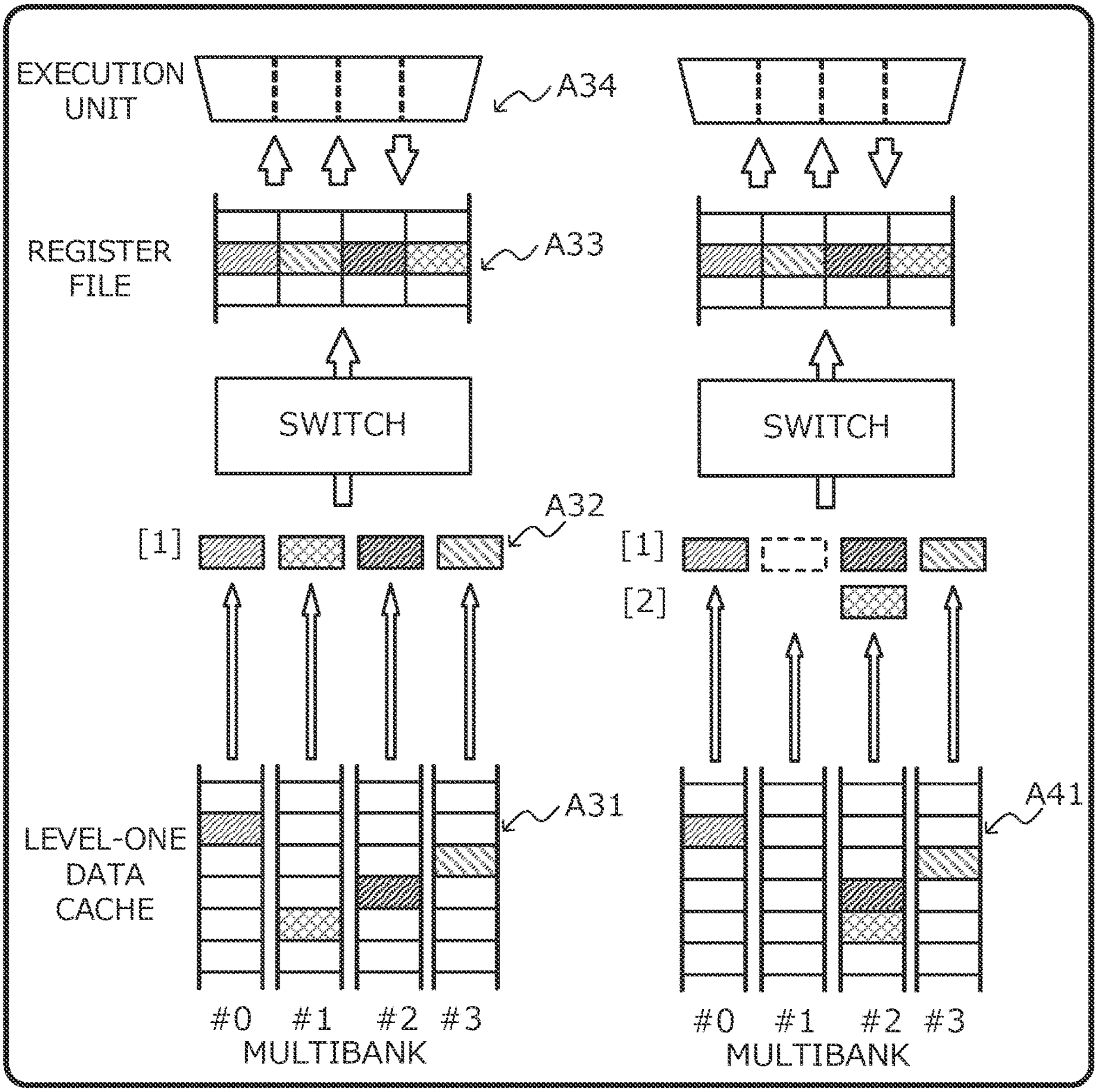
FIG. 2 is a diagram illustrating gathering in a multibanked level-one data cache of a SIMD unit.

FIG. 2 is a diagram illustrating gathering in a multibanked level-one data cache of a SIMD unit.

In the gathering process indicated by the reference symbols A31 to A34, the level-one data cache is divided into four banks #0 to #3 as indicated by the reference symbol A31. Even if the addresses are non-contiguous, at most four elements can be simultaneously read one from each of the banks #0 to #3. As indicated by the reference symbol A32, the four elements can be read all at once by a single access unit [1]. Then, as indicated by the reference symbol A33, the four elements are written into the register file via a switch rather than the shifter. After that, the four elements written into the register file as indicated by the reference symbol A34 are used by the execution unit.

However, in the reference symbol A41, two elements are stored in the bank #2, and a bank conflict occurs. Since these two elements are unable to be read simultaneously, the processing speed may be lowered.

Figure 3:
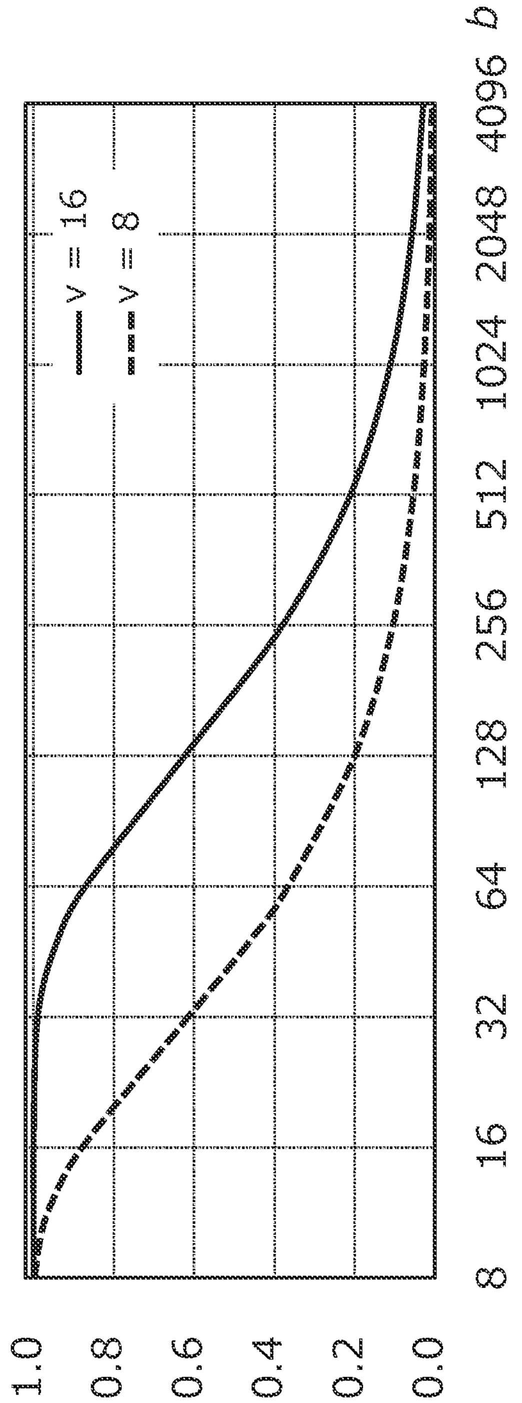
FIG. 3 is a graph illustrating a probability of bank conflicts.

FIG. 3 is a graph illustrating a probability of bank conflicts.

The probability of bank conflicts is expressed by the following expression (1) in a case where the banks are randomly accessed. In the expression, the symbol b represents the number of banks and the symbol v is the number of elements.

[Expression 1]

$$P(b, v) = 1 - \left\{ \frac{b-1}{b} \times \frac{b-2}{b} \times \ldots \times \frac{b-(v-1)}{b} \right\} \quad (1)$$

In the graph illustrated in FIG. 3, the horizontal axis represents the number of banks, and the vertical axis represents probability. The broken line represents the probability of a bank conflict when v=8 and the solid line represents the probability of a bank conflict when v=16.

For example, when 32 banks, which is the twice the element number v=16, are prepared, a bank conflict occurs with a probability of P(32,16)=99.0%. Hundreds to thousands of banks are required to achieve a sufficiently low conflict probability, which is impractical.

[B] Embodiment

Hereinafter, an embodiment will now be described with reference to the accompanying drawings. However, the following embodiment is merely illustrative and is not intended to exclude the application of various modifications and techniques not explicitly described in the embodiment. Namely, the present embodiment can be variously modified and implemented without departing from the scope thereof. Further, each of the drawings can include additional functions not illustrated therein to the elements illustrated in the drawing.

Hereinafter, like reference numbers designate the same or similar elements, so repetitious description is omitted here.

<B-1> Precondition

Figure 4:
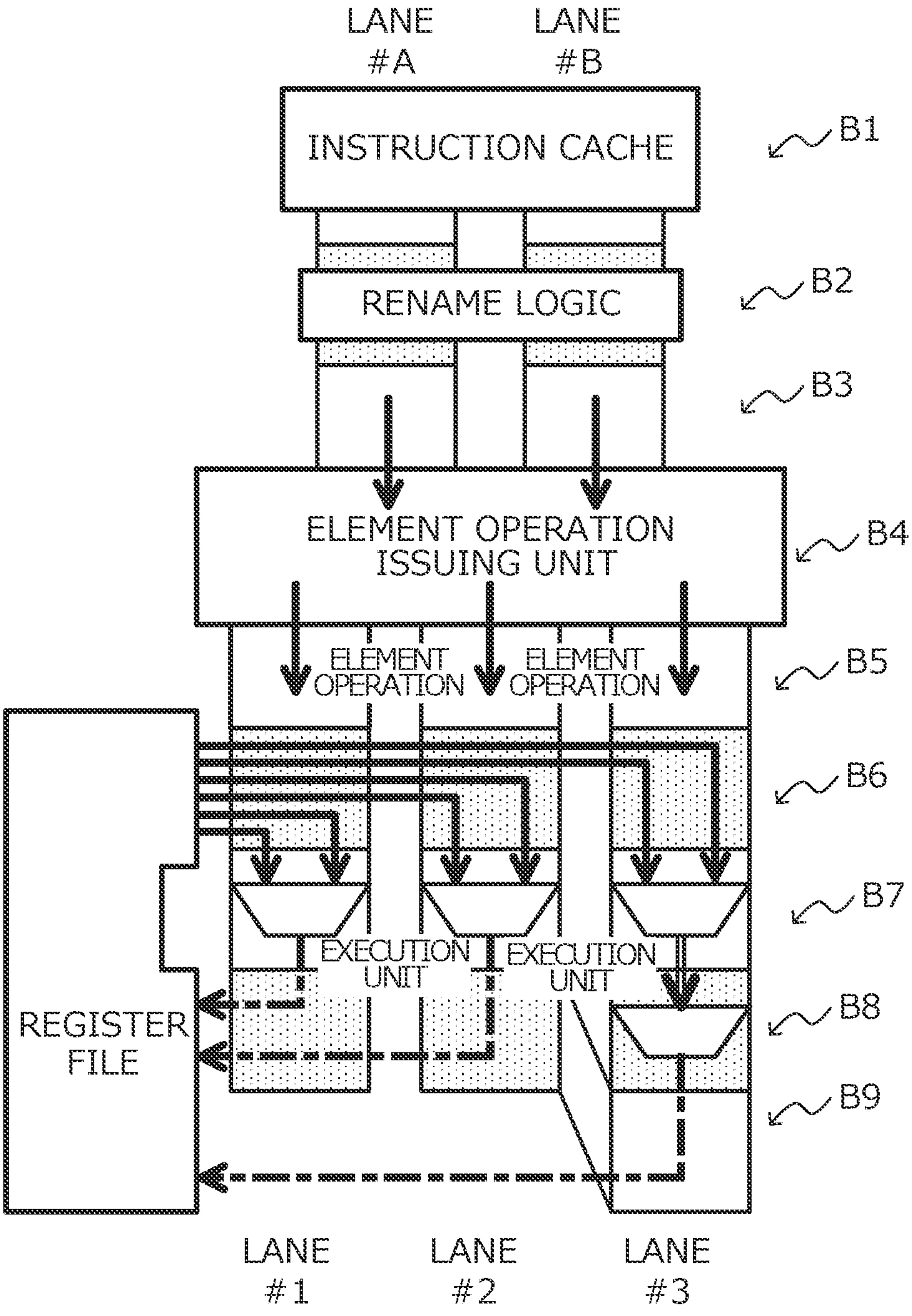
FIG. 4 is a block diagram schematically illustrating a basic structure of a core.

FIG. 4 is a block diagram schematically illustrating the basic structure of a core.

For example, the frontend pipeline, illustrated by reference symbols B1 to B3, has two lanes #A and #B, which fetch instructions and provide micro-Operations (μOPs) to the element operation issuing units. Specifically, the μOPs are generated by performing instruction fetching from an instruction cache indicated by the reference symbol B1 and renaming (in other words, instruction analysis) by the rename logic indicated by the reference symbol B2. Then, at the reference symbol B3, the generated μOPs are stored into the element operation issuing unit.

The instructions are defined in terms of Instruction Set Architecture (ISA). The instructions are stored as a binary code in the main memory, cached to the instruction cache, and are to be fetched by the machine.

A μOP is a unit obtained by decomposing a complex instruction present in, for example, x86 and SVE into multiple simple processes. The μOPs are generated from an instruction fetched in the core and are to be scheduled. SIMD μOPs are generated from a SIMD instruction. It can be understood that one μOP equivalent to the original instruction is generated in a core that does not use a μOP.

The element operation issuing unit indicated by the reference symbol B4 schedules the μOPs and inputs the element operations to the backend pipeline at appropriate timings. Putting an element operation into the backend pipeline is called issuing.

The backend pipeline indicated by the reference symbols B5 to B9 has, for example, three lanes #1 to #3 to process the issued element operations. Specifically, element operations are issued in the lanes #1 to #3 indicated by the reference symbol B5, register files are read in lanes #1 to #3 indicated by the reference symbol B6, element operations are executed in the execution units in lanes #1 to #3 indicated by the reference symbol B7, element operations are executed in the execution units in lanes #3 indicated by the reference symbol B8, and the results are written back into the register file in the lanes #1 to #3 indicated by the reference symbol B9.

An element operation is a unit of processing in a lane of the backend pipeline. For the SIMD unit, a single μOP has multiple element operations each having a width of a lane. It can be understood that, for a scalar that is not SIMD, a single element operation equivalent to the original μOP is generated. At most one element operation is issued to a lane of the backend pipeline per cycle, and one lane pipeline processes at most one element operation of an instruction per cycle. Also, one element operation may be of SIMD type again. For example, a SIMD-type element operation such as 16b×4 may be processed in a case of the 64b lane.

<B-2> Out-of-Step Backend Pipeline

Figure 5:
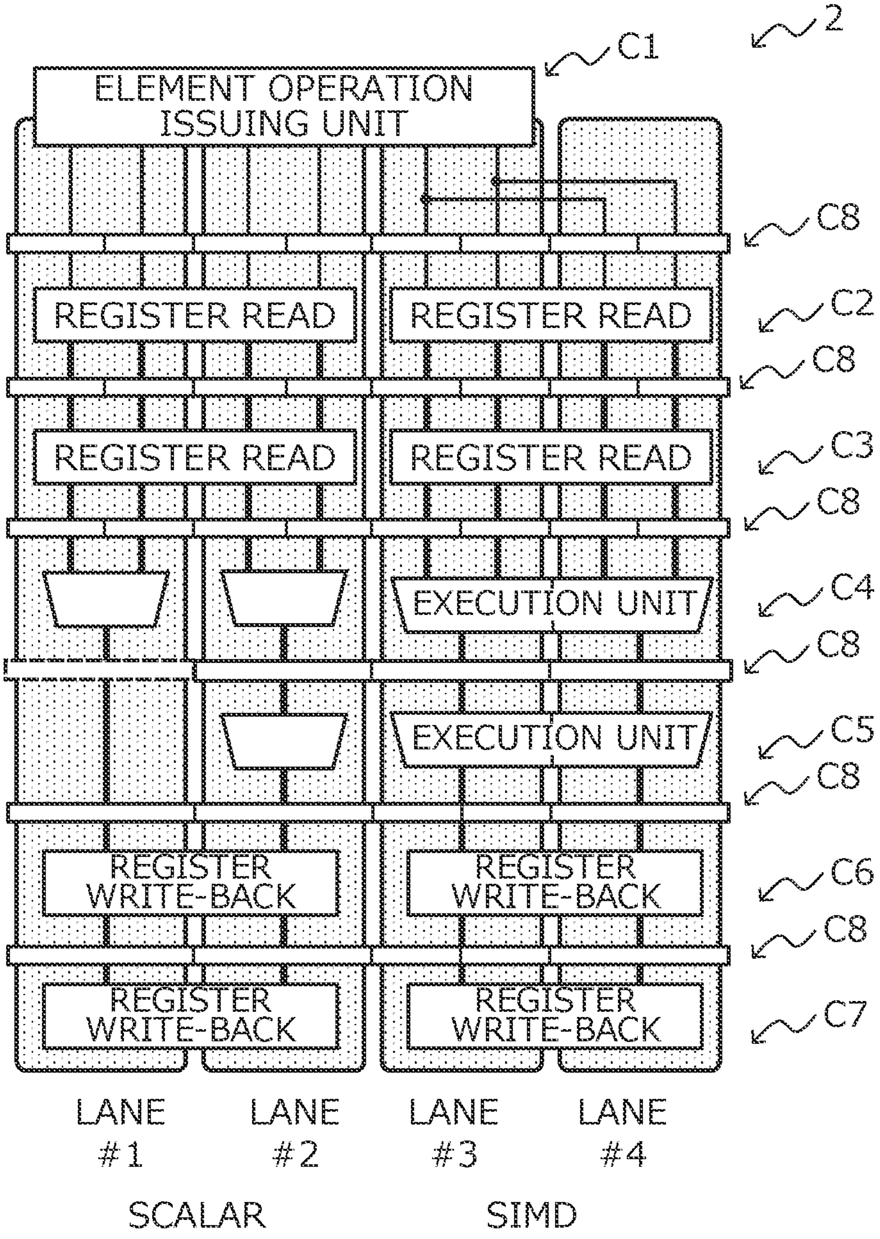
FIG. 5 is a block diagram schematically illustrating an in-step backend pipeline to be compared with an out-of-step backend pipeline of FIG. 6.
Figure 6:
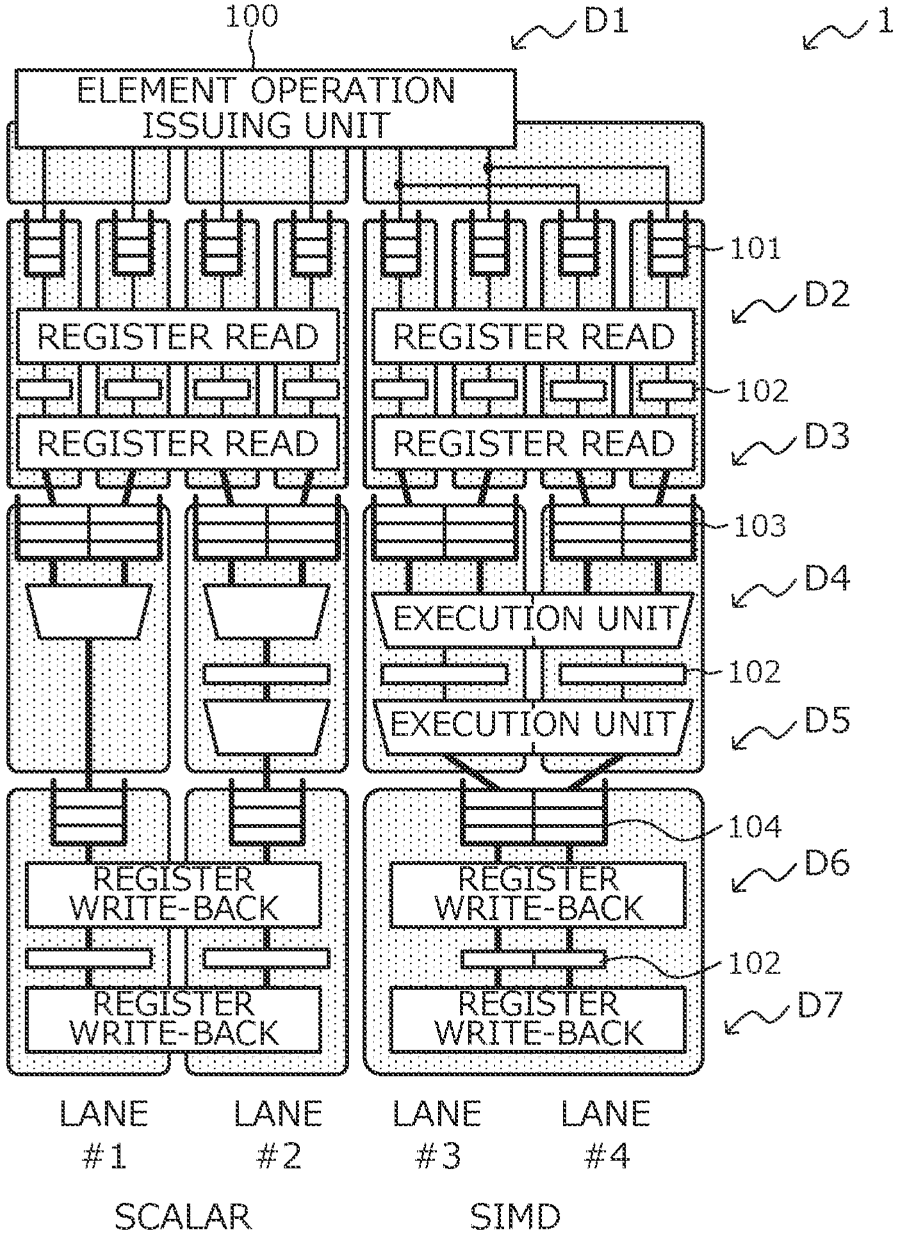
FIG. 6 is a block diagram schematically illustrating an out-of-step backend pipeline according to an embodiment.

FIG. 5 is a block diagram schematically illustrating an in-step backend pipeline 2 to be compared with an out-of-step backend pipeline 1 of FIG. 6.

An in-step backend pipeline 2 is logically divided into multiple consecutive stages by one or more pipeline registers spanning all lanes, as indicated by the symbol C8. Thus, since the entirety of the in-step backend pipeline 2 is a single pipeline that processes v element operations in parallel, the entirety of the backend pipeline either advances or stops. As a result, the spatial and temporal positional relationships of the element operations are not changed from those determined at the time of issuing.

Some or all of the one or more lanes may deal with operations of a SIMD instruction. In the examples illustrated in FIG. 5, lanes #1 and #2 have a scalar configuration, and lanes #3 and #4 have a SIMD configuration. As indicated by the reference symbol C1, element operations generated from different μOPs are issued from the element operation issuing unit to the lanes #1 and #2, and two element operations generated from one μOP are issued to the lanes #3 and #4.

As indicated by the reference symbols C2 and C3, register reads are performed in lanes #1 to #4 over two stages.

As indicated by the reference symbol C4, in the lanes #1 and #2, element operations are executed by respective different execution units, and in the lanes #3 and #4, element operations are executed by a SIMD execution unit. As indicated by the reference symbol C5, an operation is performed in the lane #2, and element operations are performed in the SIMD execution units in the lanes #3 and #4.

Then, as indicated by the reference symbols C6 and C7, the register write-back is performed in the lanes #1 to #4 over two stages.

In the backend pipeline, an incident, such as a cache miss and a bank conflict, may occur, which makes it impossible to continue processing of an element operation. Until the handling of such a cache miss, a bank conflict, or the like is completed, the element operation in question is not allowed to proceed to the next stage.

In the in-step backend pipeline 2, even when an incident, such as a cache miss and a bank conflict, may occur, which makes it impossible to continue processing of an element operation, the spatial and temporal positional relationships between element operations that have already been issued are not changed.

Stopping the entire pipeline in the event of an incident which makes it impossible to continue processing of an element operation is referred to as a pipeline stall. In the event of a pipeline stall, the positional relationship between element operations is maintained between before and after the stall.

An alternative method cancels the element operation and element operations depending on the element operation in question, or the element operation and all the subsequent element operations. The cancelled element operations are re-issued, which means that the process will be started all over again from issuing. In this alternative, the positional relationship between the element operations that have not been cancelled is kept unchanged, while the positional relationship between element operations that have been cancelled and reissued is to be reconstructed entirely. Also in this alternative, the positional relationship between the already issued element operations is not changed.

In either case of a pipeline stall and cancellation of element operations, an occurrence of one cache miss, bank conflict, or the like affects many element operations. The influence relatively increases with the scale of the core.

FIG. 6 is a block diagram schematically illustrating an out-of-step backend pipeline 1 in an embodiment.

An out-of-step backend pipeline is the negation and complement of an in-step backend pipeline. In the out-of-step backend pipeline 1 (in other words, the operation processing apparatus), element operations do not keep the spatial and temporal positional relationship when being issued.

Some or all of the one or more lanes may deal with operations of SIMD instructions. In the example illustrated in FIG. 6, like the in-step backend pipeline 2 of FIG. 5, the lanes #1 and #2 have a scalar configuration, and the lanes #3 and #4 have a SIMD configuration. As indicated by the reference symbol D1, element operations generated from different μOPs are issued from the element operation issuing unit 100 to the lanes #1 and #2, and two element operations generated from one μOP are issued to the lanes #3 and #4. Each of the issued element operations is stored into a buffer 101.

As indicated by the reference symbols D2 and D3, register reads are performed in lanes #1 to #4 over two stages. The results of the register reads are stored in the buffer 103 immediately upstream of the execution unit.

As indicated by the reference symbol D4, in the lanes #1 and #2, element operations are executed by respective different scalar execution units, and in the lanes #3 and #4, element operations are executed by an SIMD execution unit. As indicated by the reference symbol D5, in the lane #2, an element operation is executed by a scalar execution unit, and in the lanes #3 and #4, element operations are executed by a SIMD execution unit. The result of executing an element operation is stored into the buffer 104 immediately upstream of the register write-back.

Then, as indicated by the reference symbols D6 and D7, the register write-back is performed in the lanes #1 to #4 over two stages.

In the out-of-step backend pipeline 1, the element operation issuing unit 100 may be the same as in-step backend pipeline 2, and may issue element operations in a dependent relationship at a timing at which data can be passed by the register file or bypass in cases where it is presumed that an incident which makes it impossible to continue processing of an element operation does not occur. On the other hand, the lanes of out-of-step backend pipeline 1 change the positional relation of the element operation when it is issued by the element operation issuing unit 100 as desired and correctly process the operation operator.

The buffers 101, 103, and 104 serving as stage boundaries in the out-of-step backend pipeline 1 of FIG. 6 are each a buffer composed of multiple entries rather than a pipeline register with a single entry.

The entirety of the out-of-step backend pipeline 1 is separated into multiple sections by the buffers 101, 103, and 104.

In cases where an element operation that is incapable of continue the processing thereof due to a cache miss, a bank conflict, or the like is present in a certain section, the section in question stops the processing. This is called a section stall. On the other hand, the upstream sections separated by the buffers can continue the processing. In cases where any element operation that proceeds to the stalled section after completing the process in the upstream section is present, it is sufficient that the element operation is stored in the buffer. In in-step backend pipeline 2 illustrated in FIG. 5, since these buffers are pipeline registers with a single entry (see reference symbol C8), the element operation would be overwritten unless the upstream sections stop. That is, in the out-of-step backend pipeline 1, each section can stall independently. Unlike the pipeline register in C8 of the in-step backend pipeline 2, the pipeline registers 102 in the out-of-step backend pipeline 1 do not span all lanes, but operate independently in units of section.

Separating into sections is not bound by lane boundaries. For example, since reading from the buffer 101 and writing into the buffer 103 can be performed by each of two source operands, each lane has two sections for register read and allows that two source operands do not read simultaneously. On the other hand, the reading from the buffer 104 is performed simultaneously in the lanes #3 and #4, and the section of the register write-back for the lanes #3 and #4 spans the lanes #3 and #4.

The buffers 101, 103, and 104 in the out-of-step backend pipeline 1 may be of First In-First Out (FIFO) buffers, so that this alternative does not allow overtaking of element operations in a lane.

Specifically, the out-of-step backend pipeline 1 includes one or more lanes each of which processes at most one element operation of an instruction at every cycle, and an element operation issuing unit 100 that issues element operations to the one or more lanes. The entirety of the out-of-step backend pipeline 1 is separated into multiple sections by the buffers 101, 103, and 104. Zero or more sections that are no longer able to continue the processing of element operations stop the processing, while the remaining sections each store element operations that are to proceed to the downstream section into the immediately downstream buffer and continue the processing of element operations.

One or both of the register file and the level-one data cache have multibanked configurations, and a bank conflict in a multibank configuration may be one of the causes that makes it impossible to continue the processing of an element operation.

Since out-of-step backend pipeline 1 only delays the result of scheduling by the element operation issuing unit 100, the hardware cost can be minimized.

Figure 7:
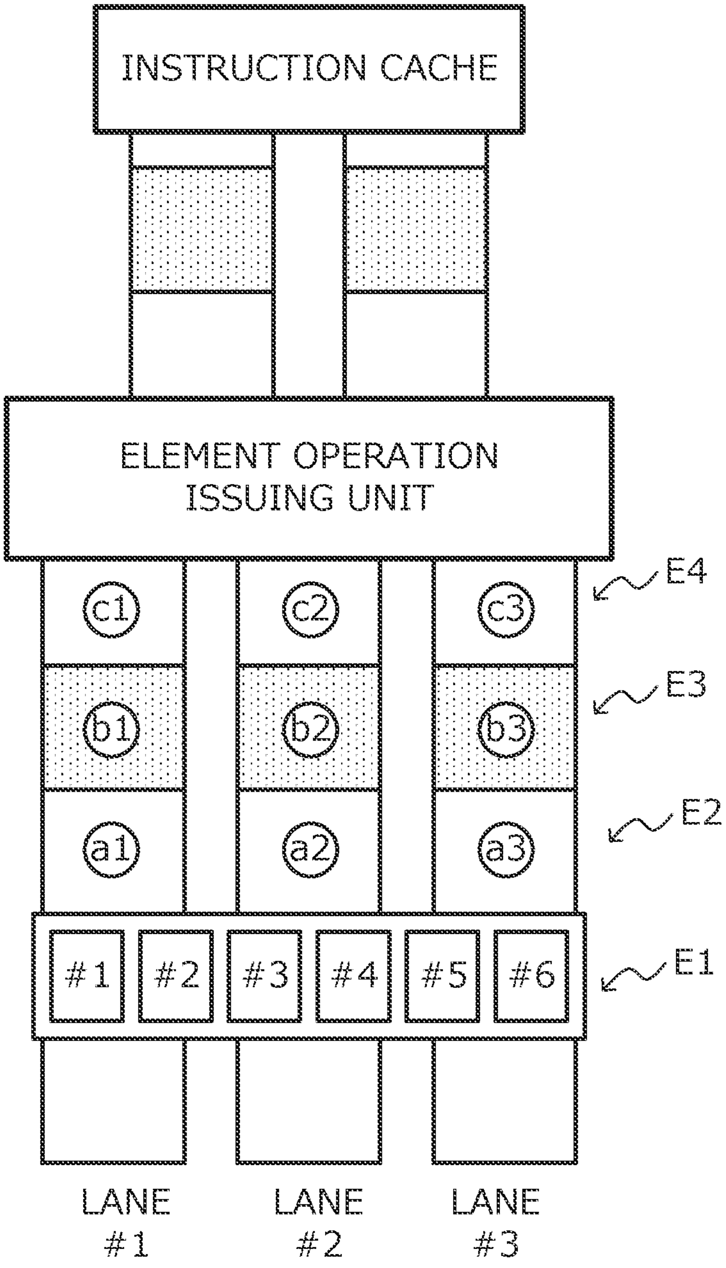
FIG. 7 is a block diagram schematically illustrating an effect of the out-of-step backend pipeline of FIG. 6.

FIG. 7 is a block diagram schematically illustrating an effect of the out-of-step backend pipeline 1 of FIG. 6.

Description will now be made in relation to an example of randomly determining a bank to be accessed in an out-of-step backend pipeline 1 having a multibanked level-one data cache with six banks #1 to #6 as indicated by the reference symbol E1 by referring to FIG. 7.

To the lanes #1 to #3, the element operations al to a3 are respectively issued as indicated by the reference symbol E2, then the element operations b1 to b3 are respectively issued as indicated by the reference symbol E3, and finally the element operations c1 to c3 are respectively issued as indicated by the reference symbol E4.

Figure 8:
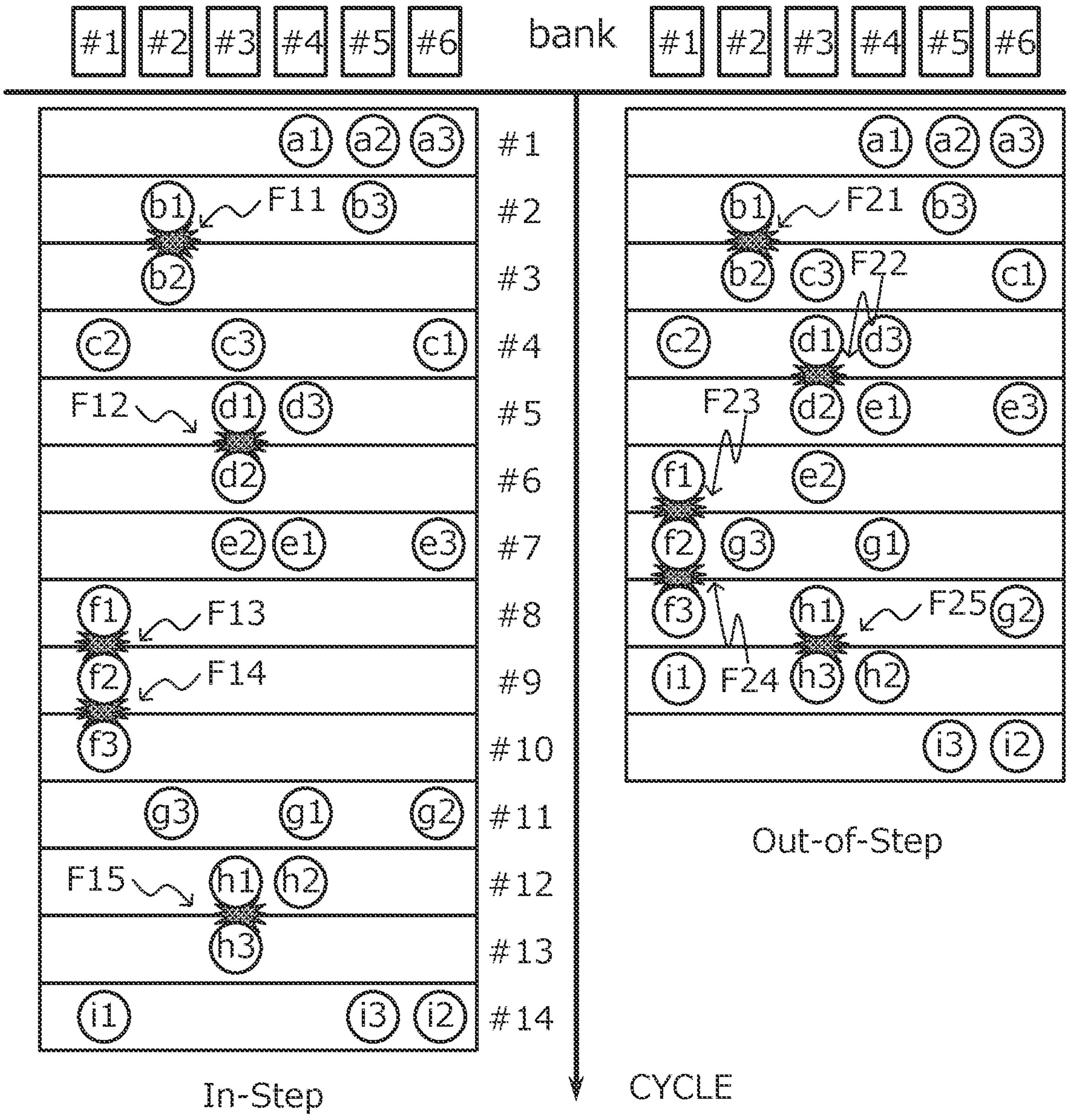
FIG. 8 is a diagram illustrating an effect of the out-of-step backend pipeline of FIG. 6.

FIG. 8 is a diagram illustrating an effect of the out-of-step backend pipeline 1 of FIG. 6. The drawing indicates in which bank of #1 to #6 the issued element operation is present at each time point.

As indicated by reference symbols F11 to F15, five bank conflicts occur in the in-step backend pipeline 2, and 14 cycles are consumed until all element operations are completed. The conflict probability is P(6,3)=0.44, and the throughput degradation is 44%.

In contrast, as indicated by reference symbols F21 to F25, although five bank conflicts occur in the out-of-step backend pipeline 1 the same as in the in-step backend pipeline 2, only 10 cycles are consumed until the completion of all the element operations, and therefore the throughput degradation is almost zero. This is because, although the conflict probability P(6,3)=0.44 is the same as in the in-step backend pipeline 2, the next element operations are processed in the same cycles even if a bank conflict occurs.

<B-3> Bypass Control

The out-of-step backend pipeline 1 correctly bypasses the execution results between element operations whose positional relationship has changed due to delays caused by section stalls.

All or part of the entries of the buffers and pipeline registers located upstream of the execution units that execute element operations may have a function to receive source operands from the bypass.

The buffer 103 immediately upstream of the execution unit functions as a secondary element operation issuing unit that waits for an execution result delayed in being bypassed as a source operand. Because the buffer 103 is of FIFO, if the source operands of the element operation at the top are ready, the element operation may be executed in the execution unit.

Figure 9:
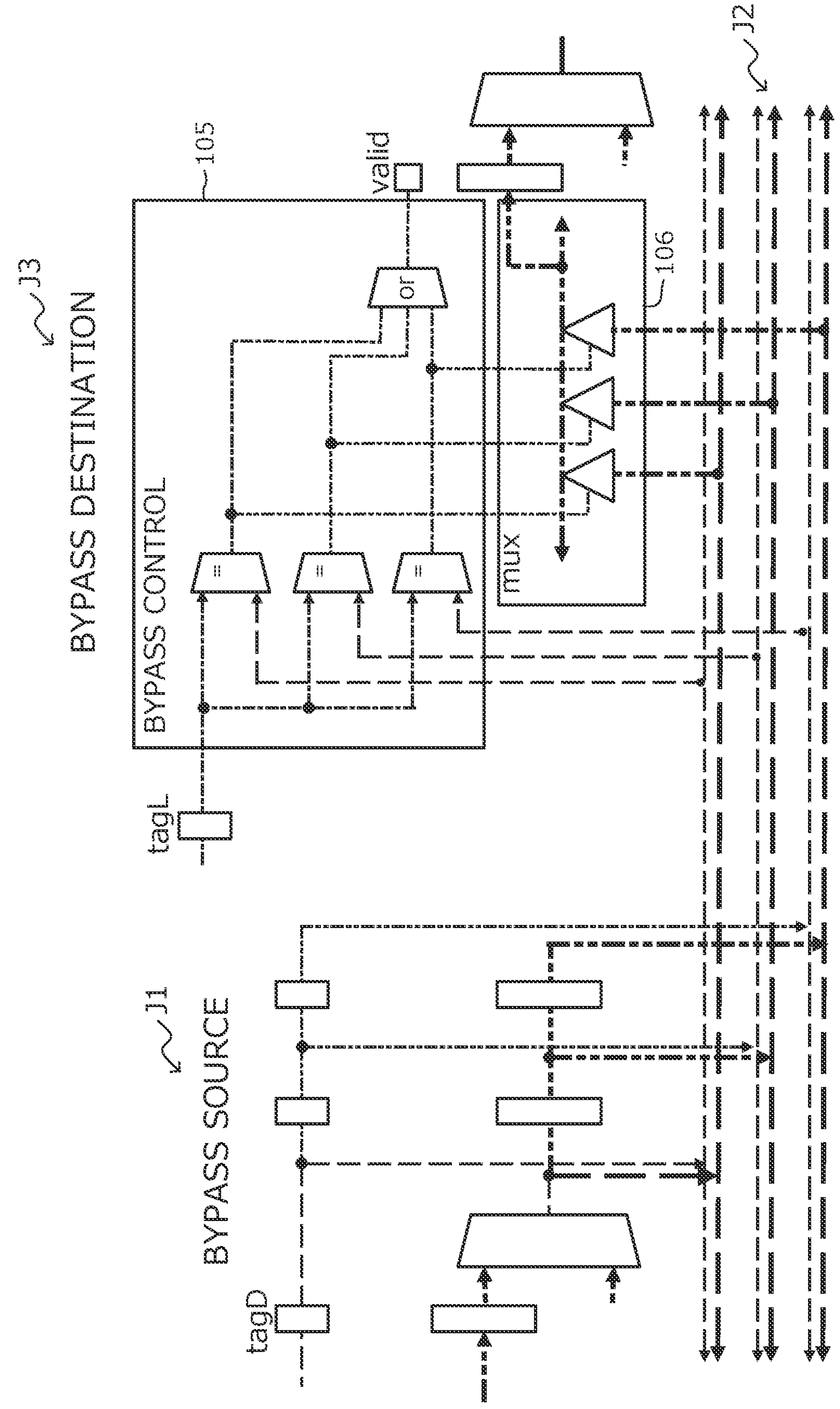
FIG. 9 is a diagram illustrating bypass control using a distributed Content-Addressable Memory (CAM) in the out-of-step backend pipeline of FIG. 6.

FIG. 9 is a diagram illustrating bypass control using a distributed CAM in the out-of-step backend pipeline 1 of FIG. 6.

In the backend pipeline illustrated in FIG. 9, an execution unit at the bypass source indicated by the reference symbol J1 is connected to an execution unit at the bypass destination indicated by the reference symbol J3 via a bypass line indicated by the reference symbol J2. In a circuit at the bypass destination, a bypass controlling circuit 105 performs bypass control by controlling a multiplexer (mux) 106. The bypass source circuit indicated by the reference symbol J1 attaches a destination tag tagD that uniquely identifies an execution result, and sends the execution result to the bypass line J2. The bypass controlling circuit 105 compares the received tagD with a source-tag tagL, and if the tags match, the multiplexer 106 captures the execution result associated with the tagD. The reference symbols 105 and 106 form a Content-Addressable Memory (CAM) that uses the tags as the key.

Bypass control may be accomplished by tracking, in accordance with the section stalls, entries of buffers or pipeline registers that hold two element operations that pass the execution result through the bypass.

Then, the tracking according to the section stall may be performed using dependence matrices expressing the relationship of the necessity of transmission and reception through the bypass between the two element operations in the form of a matrix.

Figure 10:
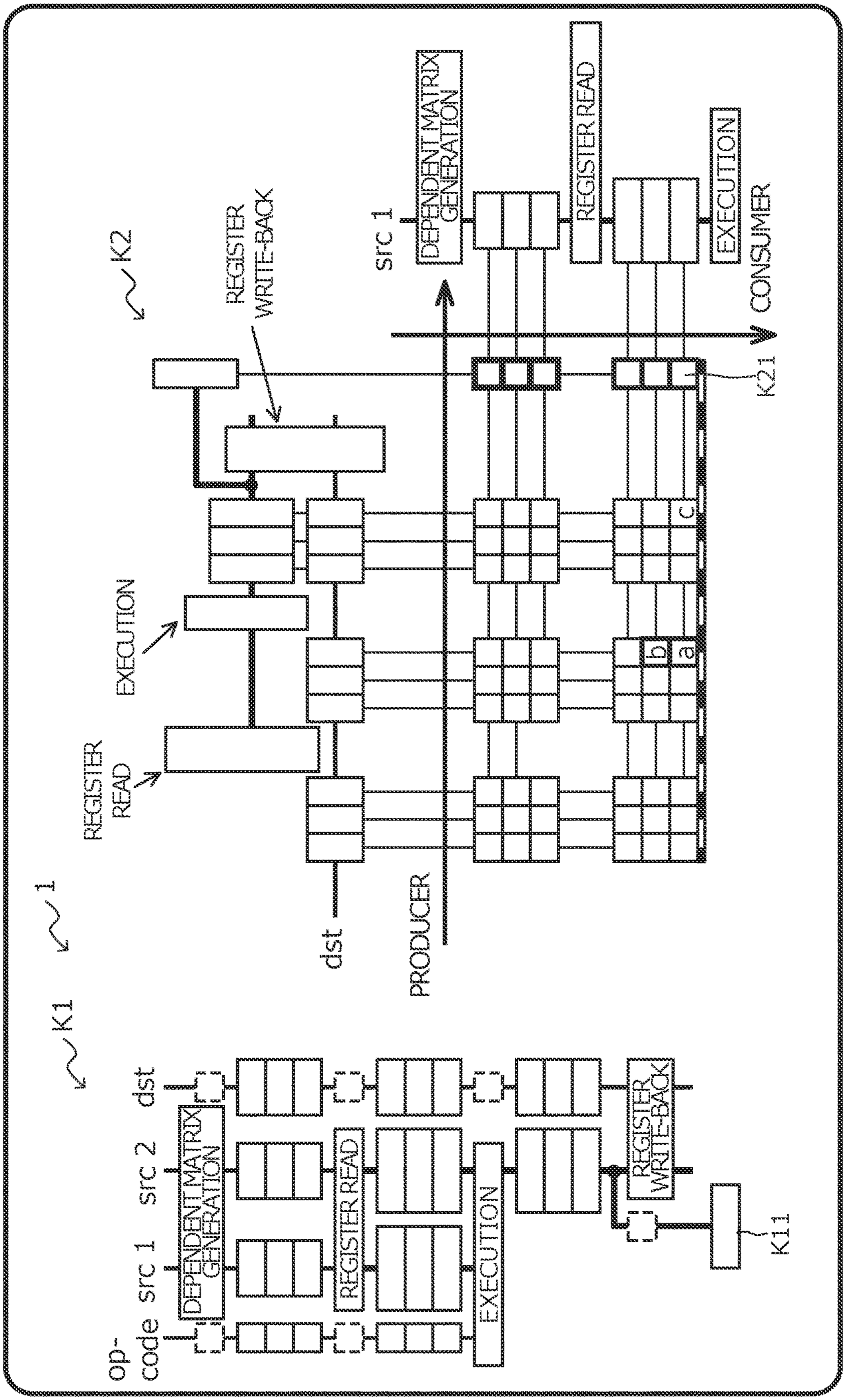
FIG. 10 is a block diagram schematically illustrating dependence-matrix bypass control and a bypass position in the out-of-step backend pipeline of FIG. 6.

FIG. 10 is a block diagram schematically illustrating dependence-matrix bypass control and a bypass position in the out-of-step backend pipeline 1 of FIG. 6.

The reference symbol K1 represents a block diagram illustrating the out-of-step backend pipeline 1 composed of one lane. As indicated by the reference symbol K1, an element operation that flows through the lane has the following fields: opcode op-code, source operands src 1 and src 2, and destination operand dst. In the block diagram indicated by the reference symbol K1, each of register read, execute, and register write-back is performed in one stage, which is separated into sections by buffers each having three entries. The reference symbol K11 represents a pipeline register that holds an execution result for one cycle in order to extend the period during which bypassing can be performed by one cycle.

The reference symbol K2 indicates a dependence matrix of the dst and the src 1 indicated by the reference symbol K1. In addition, there is a dependence matrix of the dst and the src 2.

In a block diagram indicated by the reference symbol K2, the upper part of the horizontal axis (producer) represents the portion related to the dst extracted the block diagram of the reference symbol K1, which is rotated by 90° to the left. On the right side of the vertical axis (consumer), a part related to the src 1 extracted from the block diagram of the reference symbol K1 is drawn.

The lower left part of the two axes is the dependence matrix. The vertical axis (consumer) and the horizontal axis (producer) represent entries of the buffer and the pipeline register in the lanes of the consumer/producer element operations. In cases where the element operation stored in the p-th entry from the upstream end and the element operation stored in the c-th entry from the upstream end are in a dependent relationship via the dst of the former entry and the src 1 of the latter and the execution result needs to be transmitted and received through the bypass, the element on the row c and the column p in the dependence matrix is set to "1".

Since the number of destination operands in a dependent relationship with a certain source operand is at most one if any, the number of elements to be set in a certain row is at most one if any, which means "one hot". The dependence matrix may be generated by a dependence matrix generating circuit that is an array of a tag comparator.

Figure 11:
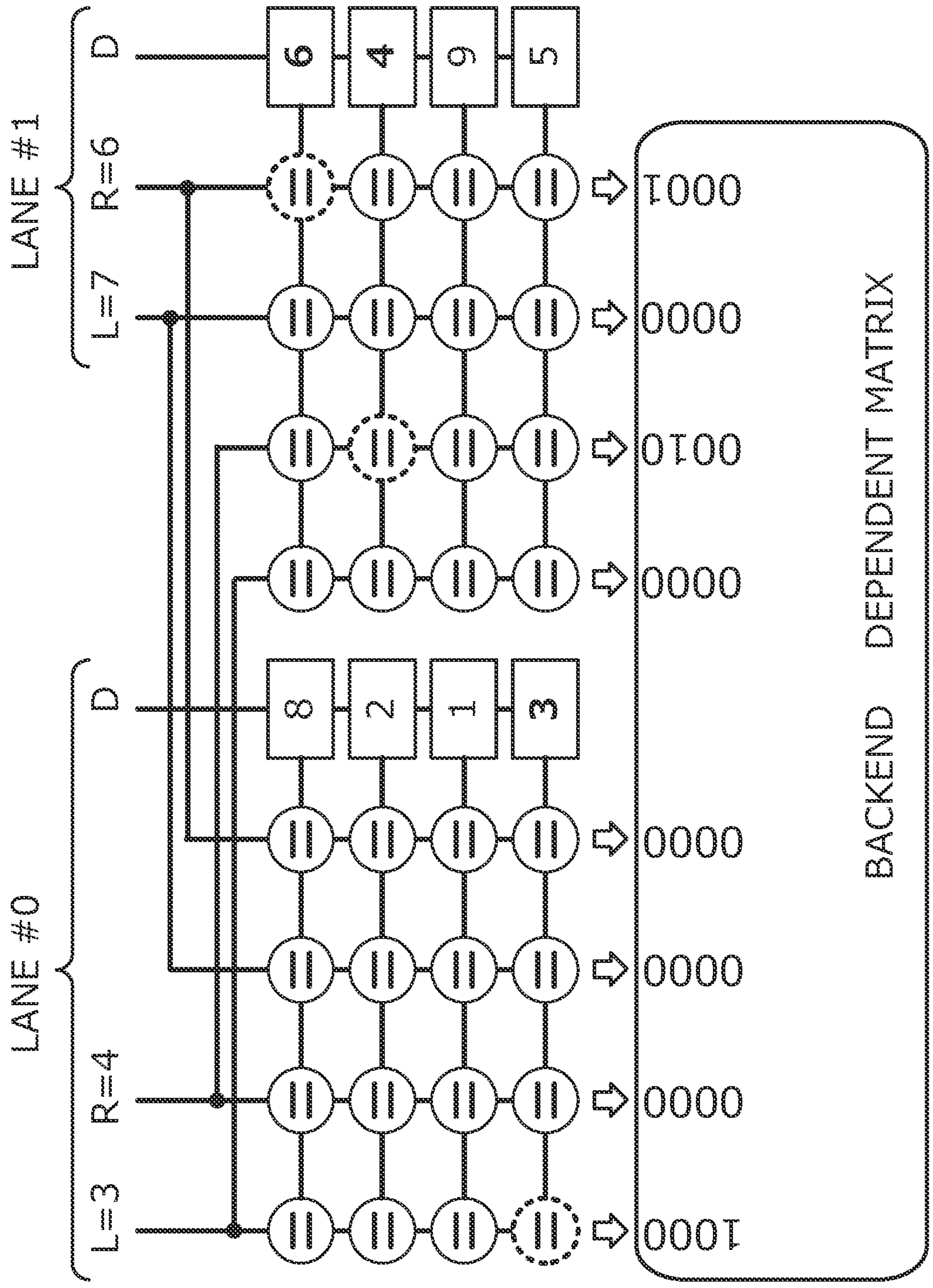
FIG. 11 is a diagram schematically illustrating a dependence matrix generating circuit.

FIG. 11 is a diagram schematically illustrating a dependence-matrix generating circuit.

The value "1" indicating that the bypassing is necessary is generated by the dependence matrix generating circuit illustrated in FIG. 11, and appears in any of the square fields of the row corresponding to the buffer before the register read in the dependence matrix.

The dependence matrix is shifted in two dimensions, i.e., simultaneously in the row and column directions, in accordance with the status of the section stalls. As a result, the value "1" representing the dependent relationship stays at the same position, or moves right, lower right, or lower.

Bypassing is carried out after the cycle in which the producer passes through the execution stage. At that time, each row is then the one-hot selection input into the multiplexer from the bypass.

In the in-step backend pipeline 2, since the positional relationship between the producer and the consumer does not change, the constraints on the timing of bypassing are strict.

In contrast, in the out-of-step backend pipeline 1, the positional relation between the producer and the consumer for bypassing can be changed. Since the consumer having not received the execution result from the producer waits at the buffer 103 immediately upstream of the execution unit, it is sufficient that to perform bypassing to the buffer 103.

In addition, a bypass that is used infrequently may be omitted. In a case where it is ensured that the execution result is received at a downstream entry of a certain entry from a second bypass path different from a first bypass path even when the first bypass of the entry is omitted, the first bypass is omitted.

Whether or not a bypass path exists may be determined for each square field of the dependence matrix indicated by the reference symbol K2 illustrated in FIG. 10. The bypassing is performed in a cycle in which the square field with bypass path holds "1" in the dependence matrix.

In order to ensure that the necessary bypassing can be surely performed, square fields with bypass paths may be arranged such that all the values "1" surely pass one or more square fields with bypass paths.

For this purpose, it is sufficient to arrange the square fields in the rightmost column of the reference symbols K21.

However, receiving bypassing in the rightmost column of the reference symbol K21 means that two element operations in a dependent relationship with each other are always executed at an interval of two or more cycles. Accordingly, from the viewpoint of the throughput, it is better to have bypassing in the square fields indicated by "a" and "b" or "c" in the reference symbol K2. The square field "a" is the position where two element operations in a dependent relationship with each other is performed back-to-back in two consecutive cycles. The square fields "b" and "c" are positions in the case where they are executed one cycle apart. The position at the square field "c" is more flexible, but the square field "b" is lower in cost.

In cases where the dependence matrix generating circuit illustrated in FIG. 11 determines that the execution result needs to be received from the bypass, no access to the register files is needed. Therefore, when the register files are also multibanked, unnecessary access to the register files may be omitted according to the determination made by the dependence matrix generating circuit.

<C> Effect

Figure 12:
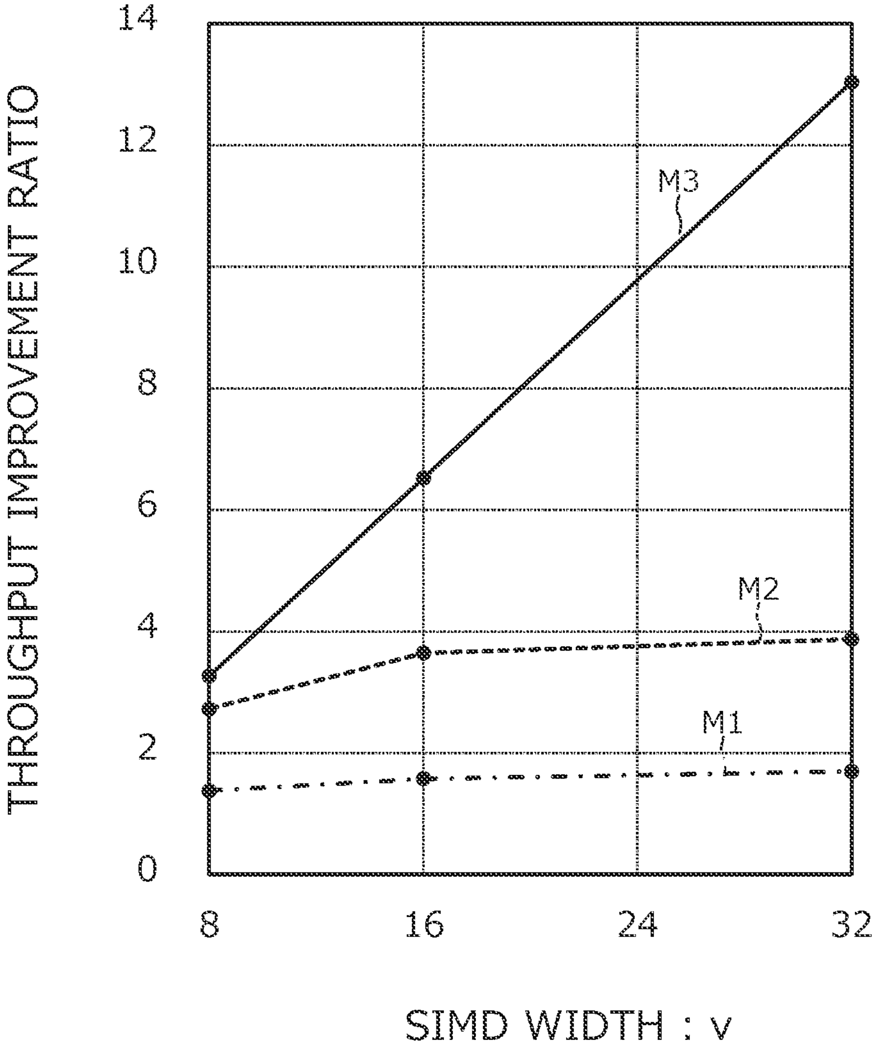
FIG. 12 is a graph illustrating throughput estimation of a scalar product of a HPCG.

FIG. 12 is a graph illustrating throughput estimation of a scalar product of a HPCG.

In the graph illustrated in FIG. 12, the horizontal axis represents a SIMD width v, the vertical axis represents the throughput improvement ratio.

The number of banks is 4v, which is twice the number of accesses. The one-dot broken line indicated by the reference symbol M1 represents the throughput estimation of the scalar product part of the HPCG in a conventional supercomputer, and the dashed line indicated by the reference symbol M2 represents throughput estimation of the scalar product part of the HPCG in a conventional supercomputer adopting a multibank level-one data cache. The solid line indicated by the reference symbol M3 represents throughput estimation of the scalar product part of the HPCG in a conventional supercomputer adopting the out-of-step backend pipeline 1 in addition to a multibank level-one data cache.

In the case of the reference symbol M1, since the gathering throughput is constant, the throughput improvement ratio is hardly improved with respect to the SIMD width v. Further, in the case of the reference symbol M2, the throughput improvement ratio about twice as large as that of the reference symbol M1 can be obtained, but in the range of a large SIMD width v, the throughput improvement ratio is not improved due to bank conflicts.

On the other hand, in the case of the reference symbol M3, the throughput improvement ratio can be linearly improved even in the range of a large SIMD width v.

According to the out-of-step backend pipeline 1 in the example of the embodiment described above, for example, the following advantages and effects can be achieved.

The out-of-step backend pipeline 1 (i.e., operation processing apparatus) includes one or more lanes each of which processes at most one element operation of an instruction at every cycle, and the element operation issuing unit 100 that issues at most an element operation to each of the one or more lanes at each cycle. The entirety of the out-of-step backend pipeline 1 is separated into multiple sections by buffers. One or more sections that are no longer able to continue processing of element operations stop the process, while the remaining sections each store an element operation proceeding to a downstream section into an immediately downstream buffer and makes immediately downstream sections continue the processing.

With this configuration, even when a bank conflict or a cache miss occurs in a certain section, pipeline stall and cancellation of an element operation can be avoided so that a decrease in processing speed can be suppressed.

<D> Miscellaneous

The techniques disclosed herein should by no means be limited to the embodiment described as the above and can be modified and implemented without departing from the scope of the embodiment. The respective configurations and processes can be selected, omitted, or combined according to the requirement.

In one aspect, even when incident that makes it impossible to continue processing and that is exemplified by a bank conflict or a cache miss occurs in a certain section, a pipeline stall and cancellation of an element operation can be avoided so that a decrease in processing speed can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor core comprising:

a frontend pipeline that fetches an instruction and generates a micro-operation and stores the generated micro-operation in an element operation issuing circuit; and a backend pipeline, wherein the element operation issuing circuit is configured to:

receive the generated micro-operation from the frontend pipeline;

schedule the generated micro-operation; and issue one or more element operations generated from the micro-operation to respective ones of one or more lanes of the backend pipeline, the backend pipeline is configured to:

receive the one or more element operations from the element operation issuing circuit; and process the one or more element operations in the respective lanes, the backend pipeline comprises a plurality of sections separated by buffers including a plurality of entries, when zero or more, and less than all, and not a most-downstream, of the sections stop processing, a remainder of the sections not including the most-downstream of the sections continue processing by storing element operations proceeding to a downstream one of the sections into at least one of the buffers immediately downstream thereof respectively, downstream being a direction in which the element operations proceed to, and the backend pipeline is further configured to track the entries by matrices with c-th row and p-th column element set if a producer element operation stored in a p-th location from an upstream end and a consumer element operation stored in a c-th location from the upstream end transmits and receives an execution result through a bypass, respectively, by setting a corresponding element in the matrices when an element operation is issued, and by shifting elements in row and column directions according to the stopping of the sections.

* * * * *